US012000580B2

(12) United States Patent
Tang et al.

(10) Patent No.: US 12,000,580 B2
(45) Date of Patent: Jun. 4, 2024

(54) ANNULAR LIGHT-GUIDE INTEGRATED INTO A MESH NETWORK DEVICE

(71) Applicant: Google LLC, Mountain View, CA (US)

(72) Inventors: Vivian W. Tang, Mountain View, CA (US); DuanYing Lin, New Taipei (TW); Clare M. Zhang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 105 days.

(21) Appl. No.: 17/638,547

(22) PCT Filed: Sep. 26, 2019

(86) PCT No.: PCT/US2019/053241
§ 371 (c)(1),
(2) Date: Feb. 25, 2022

(87) PCT Pub. No.: WO2021/061133
PCT Pub. Date: Apr. 1, 2021

(65) Prior Publication Data
US 2022/0307684 A1    Sep. 29, 2022

(51) Int. Cl.
*F21V 33/00*     (2006.01)
*F21V 8/00*      (2006.01)
(Continued)

(52) U.S. Cl.
CPC ...... *F21V 33/0052* (2013.01); *F21V 23/0435* (2013.01); *G02B 6/0051* (2013.01); *G02B 6/0073* (2013.01); *G08B 21/18* (2013.01)

(58) Field of Classification Search
CPC . G08B 21/18; F21V 33/0052; F21V 23/0435; G02B 6/0051; G02B 6/0073; G02B 6/0001; H04L 12/44
(Continued)

(56) References Cited

U.S. PATENT DOCUMENTS

| 8,988,232 | B1 | 3/2015 | Sloo et al. |
| 2012/0098651 | A1* | 4/2012 | Ramones ............ H04L 12/6418 362/382 |

(Continued)

FOREIGN PATENT DOCUMENTS

| CN | 1716042 A | 1/2006 |
| CN | 109471491 A | 3/2019 |
| WO | 2021061133 | 4/2021 |

OTHER PUBLICATIONS

John R. Quain, Honeywell Lyric review, digitaltrends, Jul. 11, 2014 (Year: 2014).*

(Continued)

*Primary Examiner* — Brian Wilson
(74) *Attorney, Agent, or Firm* — Colby Nipper PLLC

(57) ABSTRACT

The present disclosure describes an annular light-guide integrated into a system, including a mesh network device. The system includes a lighting manager application that, when executed by a processor, causes the system to determine an operational status and select, based on the determined operational status, a color. The lighting manager application then causes the system to activate one or more light-emitting components to radiate light corresponding to the selected color and transmit, through an annular light-guide, the radiated light to provide an exterior glow under a bottom housing of the system.

20 Claims, 7 Drawing Sheets

(51) Int. Cl.
*F21V 23/04* (2006.01)
*G08B 21/18* (2006.01)

(58) Field of Classification Search
USPC .................................................. 362/551–582
See application file for complete search history.

(56) References Cited

U.S. PATENT DOCUMENTS

| | | | | |
|---|---|---|---|---|
| 2015/0163945 A1* | 6/2015 | Barton | ...................... | G08B 5/36 |
| | | | | 361/809 |
| 2016/0334076 A1* | 11/2016 | Dong | ...................... | F21V 7/041 |
| 2017/0162007 A1* | 6/2017 | Boyd | ...................... | F24F 11/58 |

OTHER PUBLICATIONS

M.B. Grant, Review: Honeywell Lyric Smart Thermostat, Jul. 16, 2014 (Year: 2014).*
"International Preliminary Report on Patentability", Application No. PCT/US2019/053241, dated Mar. 15, 2022, 8 pages.
"International Search Report and Written Opinion", Application No. PCT/US2019/053241, dated May 28, 2020, 16 pages.
"Soundcore Flare", Retrieved from the Internet at https://web.archive.org/web/20190903045706/https://www/soundcore.com/products/variant/flare/A3161011 on May 14, 2020, Sep. 3, 2019, 11 pages.
"Foreign Office Action", CN Application No. 201980099655.X, Mar. 7, 2024, 35 pages.

* cited by examiner

ANNULAR LIGHT-GUIDE INTEGRATED INTO A MESH NETWORK DEVICE

CROSS-REFERENCE OF RELATED APPLICATION

This application is a National Stage Entry of and claims priority to International Patent Application No. PCT/US2019/053241, filed on Sep. 26, 2019, the disclosure of which is incorporated by reference herein in its entirety.

BACKGROUND

A mesh network is a network that includes a mesh of nodes that link together to improve network performance and network accessibility. As an example, a mesh network supporting a wireless local area network (WLAN) may include multiple wireless nodes linking together across a large area. Each wireless node, or mesh network device, may provide a system access to the WLAN and exchange network information with other mesh network devices. The aggregate functions of the multiple mesh network devices will, in general, improve connectivity to the WLAN across the large area and improve efficiency of data exchange.

In some instances, it is beneficial for a user to be able to verify that a mesh network device is functional. As an example, a user trying to receive data through a system, such as a smartphone, may not be receiving data for an application executing on the smartphone. The user may wish to verify that a mesh network device within a proximity of the user is working, looking to the mesh network device for a visual indicator.

Today, the mesh network device may include a lighting mechanism that indicates to the user functionality of the mesh network device. However, the lighting mechanism may have a single point light source (such as a single light-emitting diode) that is not visible to the user because the mesh network device is in a corner or turned against a wall. The lighting mechanism may also emit light of a single color, limiting the ability of the user to understand aspects of functionality beyond the mesh network device simply being "on" or "off." Furthermore, lighting mechanisms of today may provide light that is harsh and aesthetically unpleasing.

SUMMARY

The present disclosure describes an annular light-guide integrated into a mesh network device. This mesh network device includes a lighting manager application that, when executed by a processor, causes the system to determine an operational status and select, based on the determined operational status, a color. The lighting manager application then causes the system to activate one or more light-emitting components to radiate light corresponding to the selected color and transmit, through an annular light-guide, the radiated light to provide an exterior glow under a bottom housing of the system.

In some aspects, a system is described. The system includes a top housing that is radially centered along a first portion of a central axis and a bottom housing that is radially centered along a second portion of the central axis. An interior space of the bottom housing contains one or more light-emitting components and an annular light-guide. The annular light-guide is configured to transmit light radiated from the one or more light-emitting components to provide an exterior glow under the bottom housing.

In some other aspects, a method is described. The method is performed by a system and includes determining an operational status of the system and selecting, based on the determined operational status, a color. The method includes activating one or more light-emitting components to radiate light corresponding to the selected color, wherein the radiated light is transmitted through an annular light-guide of the system to provide an exterior glow under a bottom housing of the system.

The details of one or more implementations are set forth in the accompanying drawings and the following description. Other features and advantages will be apparent from the description, the drawings, and the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of an annular light-guide integrated into a mesh network device. The use of the same reference numbers in different instances in the description and the figures may indicate like elements.

DETAILED DESCRIPTION

The present disclosure describes techniques directed to an annular light-guide integrated into a system such as a mesh network device. As part of the described techniques and systems, a light manager application of the system, when executed, causes the system to determine an operational status of the system and select, based on the determined operational status of the system, a color. The light manager application of the system then causes the system to activate one or more light-emitting components to radiate light corresponding to the second color and transmit, through an annular light-guide, the radiated light to provide an exterior glow under a bottom housing of the system.

While features and concepts of the described techniques can be implemented in any number of different environments, systems, devices, and/or various configurations, aspects are described in the context of the following example system, example operating environment, and example method.

Example System

Figure 1:
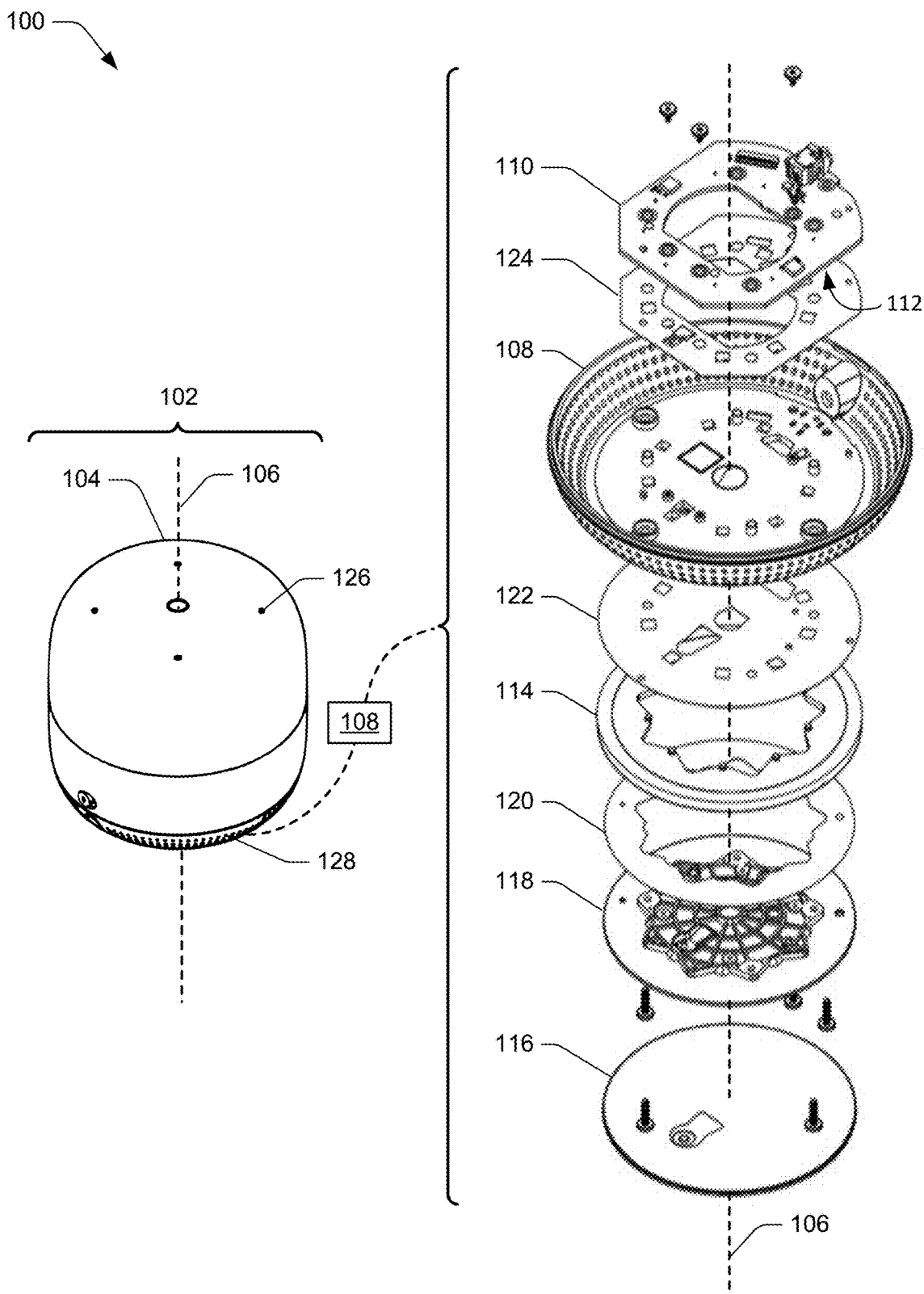
FIG. 1 illustrates a perspective view of an example system having an annular light-guide and an exploded view of a portion of the example system.

FIG. 1 illustrates a perspective view (100) of an example system 102 having an annular light-guide and an exploded view of a portion of the example system 102. The example system 102, illustrated as a mesh network device, includes a top housing 104 that is radially centered along a first portion of a central axis 106. The system 102 also includes a bottom housing 108 that is radially centered along a second portion of the central axis 106.

Contained within an interior space of the bottom housing 108 is a printed circuit board (PCB) 110 having one or more light-emitting components 112 (the light-emitting components 112 are the underside of the PCB 110 and not visible in the exploded perspective view of FIG. 1). The PCB 110 may be, for example, a glass-reinforced epoxy laminate material, such as an FR4 material, and have multiple layers and/or electrical traces, plated through-holes for through-hole components, and/or pads for surface-mount components.

The bottom housing 108 includes an annular light-guide 114. One or more light-emitting components 112 radiate light and the annular-light guide 114 transmits the radiated light to provide an exterior glow under the bottom housing 108. As illustrated in FIG. 1, the PCB 110 is disposed in a plane that is orthogonal to the central axis 106 and the annular light-guide 114 is disposed in another plane that is orthogonal to the central axis 106.

The bottom housing 108 also includes additional elements that combine with the PCB 110, the one or more light-emitting components 112, and the annular light-guide 114 to form an underglow subassembly. The additional elements include (i) a footing 116 and a reflector 118 that is disposed between the footing 116 and the annular light-guide 114, (ii) a layer of a pressure-sensitive adhesive (PSA) 120 that is disposed between the reflector 118 and the annular light-guide 114, (iii) a light-blocking tape 122, and (iv) another layer of a PSA 124 that is disposed between the PCB 110 and a surface of the bottom housing 108. The reflector 118 may include recesses that accommodate the one or more light-emitting components 112. The reflector 118 may also have channels or surfaces coated or lined with a reflective material (not illustrated in FIG. 1).

In some instances, the system 102 may interface with a surface. For example, the system 102 may set on a tabletop. In such instances, the system 102 may include a sensor for detecting light reflected from the surface. Furthermore, and in some instances, the system 102 may be capable of receiving an audible input (e.g., receive, through microphones included in the system 102, a command from a user of the system 102) and emitting an audible output (e.g., emit, through speakers included in the system 102, a message that may relate to a status of the system 102, a message that may relate to a weather or news report, a message that may relate to a home automation system, music, and so on). In such instances, the audible input can be received through ports 126 and the audible output can be emitted through perforations 128 of the bottom housing 108.

Figure 2:
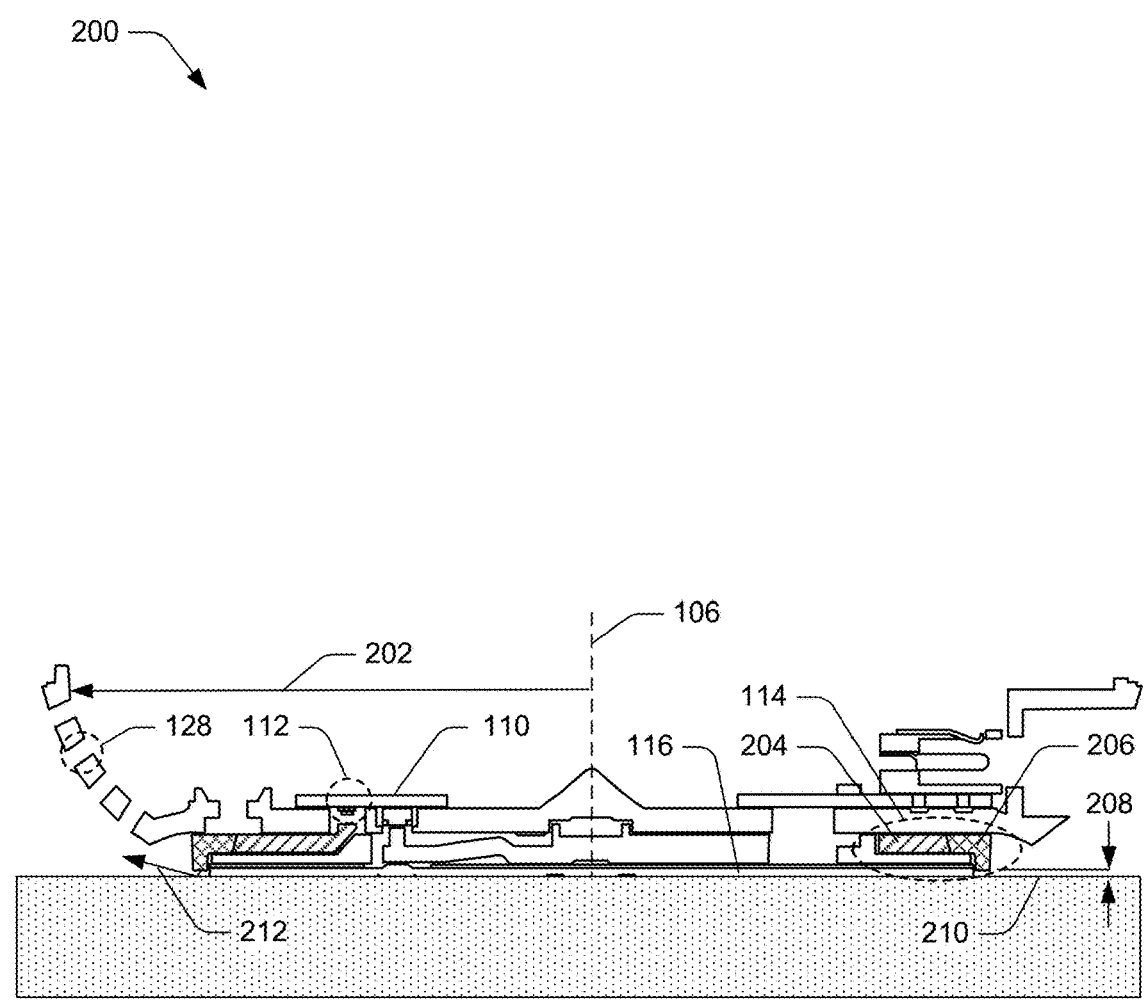
FIG. 2 illustrates a cross-sectional view of a portion of an example system having an annular light-guide.

FIG. 2 illustrates a cross-sectional view 200 of a portion of an example system having an annular light-guide. The cross-sectional view 200 is a portion of the of bottom housing 108 of FIG. 1 and illustrates one or more elements contained in the bottom housing 108.

As FIG. 2 illustrates, the bottom housing 108 is radially centered along a second portion of the central axis 106. In some instances, and as illustrated, an interior radius 202 of a wall of the bottom housing 108 as measured from the second portion of the central axis 106 varies when measured along the second portion of the central axis, resulting in an interior curvature of the wall of the bottom housing 108. In other instances, however, the interior radius 202 of the wall may be consistent.

The bottom housing 108 includes perforations 128 that may be used for audio porting. In some instances, the bottom housing 108 may be injection molded from a polymer material or a plastic material. In other instances, the bottom housing may be stamped or formed from a metal material such as stainless steel.

FIG. 2 also illustrates portions of the annular light-guide 114, including an inner-annular portion that is a light pipe 204 and an outer-annular portion that is a diffuser 206. The light pipe 204 may be made from a material such as an acrylic material or a polycarbonate material and, in general, can be transparent, clear, or translucent. The diffuser 206 may be made from a material such as an acrylic material, a polycarbonate material, or a styrene material and, in general, be translucent to help mix light. In some instances, a titanium dioxide ($TiO_2$) may be part of a material (e.g., a translucent material) to effectuate color mixing.

FIG. 2 also illustrates an example of the light-emitting component 112. The light-emitting component 112 may be a packaged component having one or more light-emitting diodes. Furthermore, the light-emitting component 112 may be a type of package that is a surface-mount package or a through-hole package that is mounted to a printed circuit board (e.g., the PCB 110 of FIG. 1).

In one instance the light-emitting component 112 includes multiple light-emitting diodes (e.g., LEDs), where the LEDs include a red light-emitting diode, a green light-emitting diode, and a blue light-emitting diode (e.g., an "RGB" LED). In such an instance, pulse-width modulation (e.g., PWM) signaling may be applied to the light-emitting component 112 to effectuate the light-emitting component 112 radiating light of a selected color. Such LEDs may be top-firing, side firing, or bottom/reverse mount depending on a geometry of the light pipe 204.

FIG. 2 also illustrates the footing 116. In some instances, and as illustrated, the footing 116 can cause a gap 208 between the bottom housing 108 and a surface 210. In such an instance, the gap 208 allows a reflected light 212 of the exterior glow from the surface 210 upon which the system 102 is placed (FIG. 2 illustrates the reflected light 212 at a single location for simplicity and clarity).

The gap 208 (facilitated by the height of the footing 116) allows an appropriate amount of light to be reflected from the surface 210 (e.g., the reflected light 212) such that an aesthetically pleasing exterior glow is under the bottom housing 108. In some instances, if the gap 208 is too "little", too little light may be reflected from the surface 210. In other instances, if the gap 208 is too "great", too much light may be reflected from the surface 210.

A dimension of the gap 208 may be dependent on qualities (e.g., intensity, color) of light that is expected to be transmitted through the annular light-guide 114. For example, in one instance and for one set of qualities, the dimension of the gap 208 may be a dimension between approximately 0.3 millimeters (mm) and 0.7 mm. In another instance and for another set of qualities, the dimension of the gap 208 may be a dimension between approximately 0.5 mm and 1.0 mm And, in yet another instance and for yet another set of qualities, the dimension of the gap 208 may be a dimension between approximately 0.1 mm and 0.4 mm.

Figure 3:
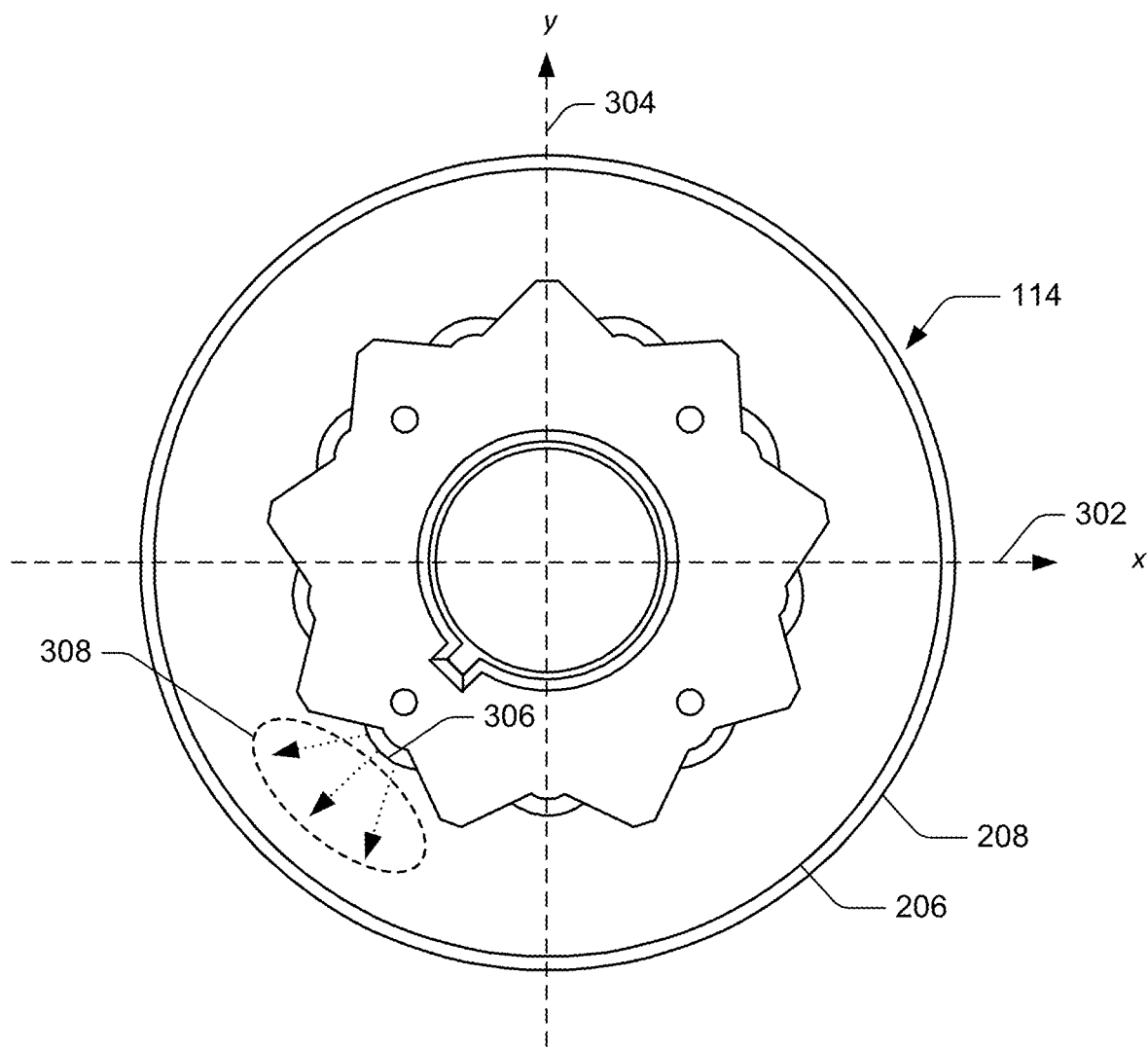
FIG. 3 illustrates a top view of an example annular light-guide in accordance with one or more aspects.

FIG. 3 illustrates a top view 300 of an example subassembly that includes an annular light-guide in accordance with one or more aspects. FIG. 3 may include elements of FIGS. 1 and 2 that are associated with the annular light-guide 114, including the inner-annular portion having the light pipe 204 and the outer-annular portion having the diffuser 206.

As illustrated in FIG. 3, the example sub-assembly is disposed in a plane defined by x-axis 302 and y-axis 304. The sub-assembly includes the inner-annular portion having the light pipe 204 and the outer-annular portion having the diffuser 206. As illustrated by FIG. 3, an inner circumference of the light pipe 204 includes, for each of the one or more light-emitting components 112 (not illustrated in FIG. 3), a respective curved recess 306 to receive and spread light 308.

Figure 4:
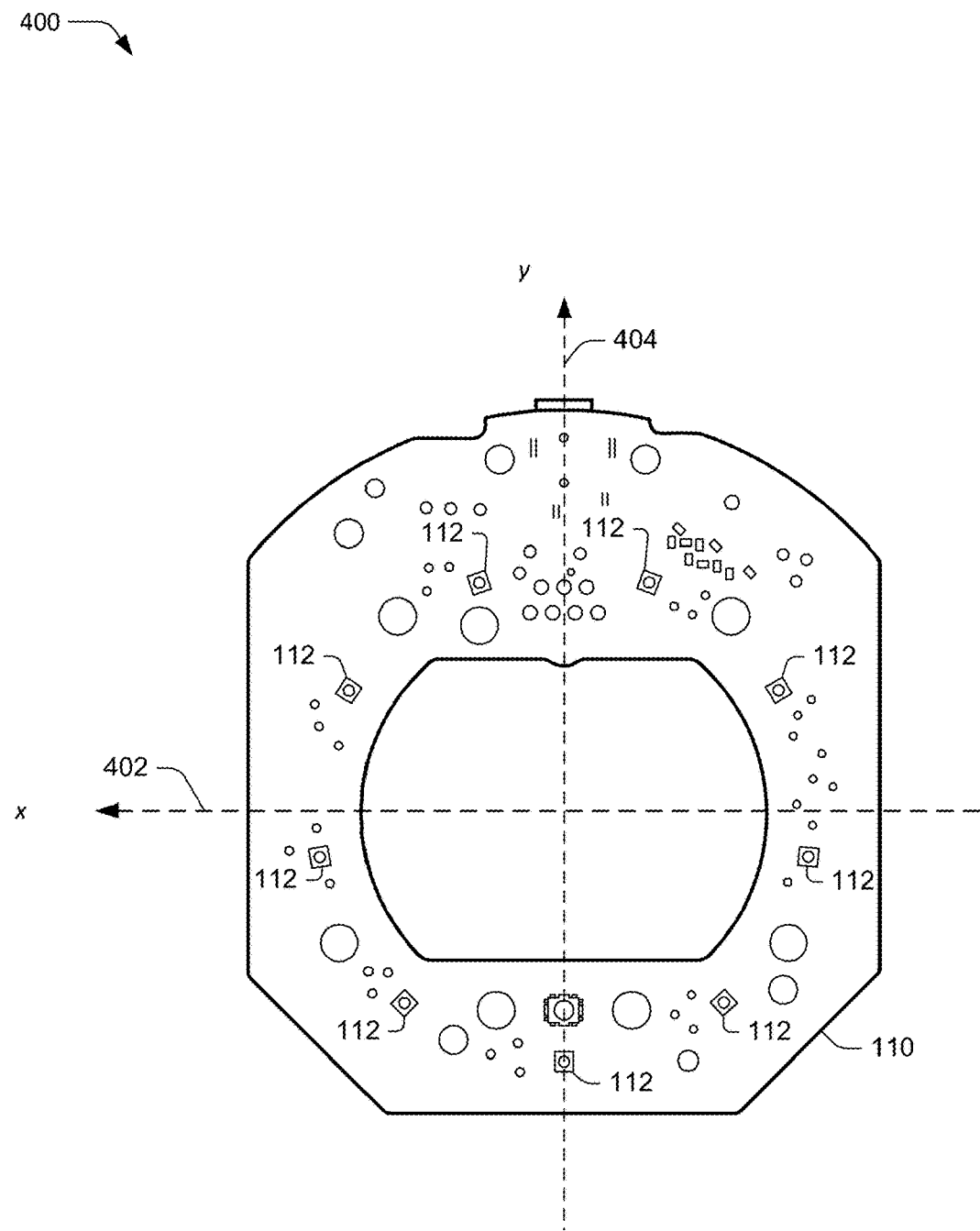
FIG. 4 illustrates a bottom view of an example printed circuit board having one or more light-emitting components in accordance with one or more aspects.

FIG. 4 illustrates a bottom view 400 of an example printed circuit board having one or more light-emitting components in accordance with one or more aspects. FIG. 4 may include elements of FIGS. 1 and 2, including the PCB 110 and the one or more light-emitting components 112.

As illustrated in FIG. 4, the PCB 110 is disposed in a plane defined by x-axis 402 and y-axis 404. The PCB 110 includes one or more light-emitting components 112 that are electrically connected to the PCB 110. The PCB 110 may include additional components, such as drivers through which power is provided to the one or more light-emitting components 112, as well as capacitors, resistors, memory, and a processor.

Although FIGS. 1-4 illustrate a system in the context of a mesh network device, it is important to note the illustrated techniques and features of FIGS. 1-4 apply to a variety of systems of device types. Other systems that can benefit from the techniques and features of FIGS. 1-4 include, for example, an automotive headlamp system, a television backlighting system, an audio speaker, and so on.

Operating Environment

Figure 5:
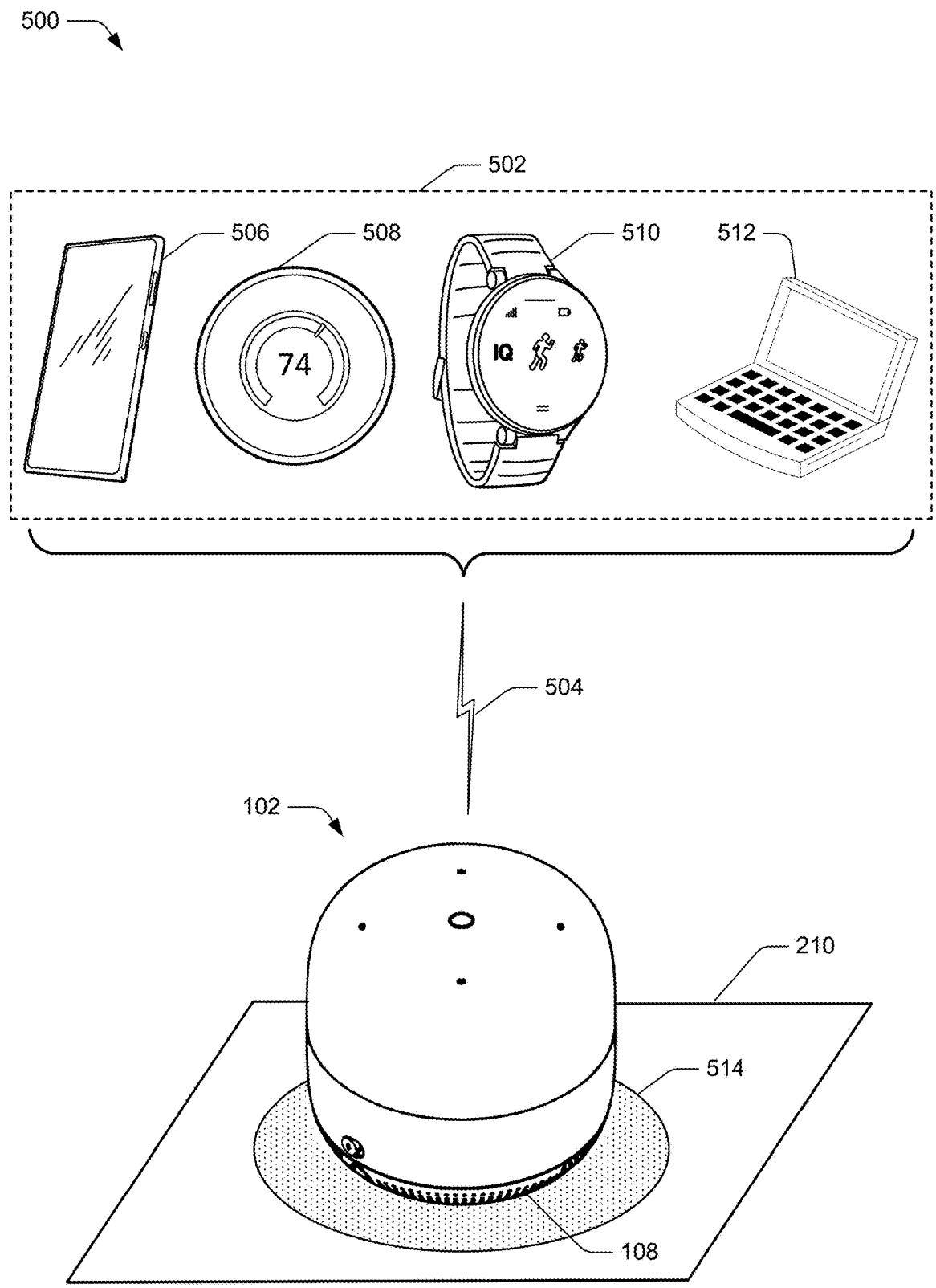
FIG. 5 illustrates an example operating environment in which various aspects of a system having an annular light-guide are implemented.

FIG. 5 illustrates an example operating environment 500 in which various aspects of a system having an annular light-guide are implemented. The system may be the system 102 of FIG. 1 and incorporate elements of FIGS. 1-4.

As illustrated by FIG. 5, the system 102 is a mesh network device that is wirelessly connected to a user equipment (UE) 502 using wireless-link 504. As examples, the UE 502 may be a device such as a smartphone 506, an Internet-of-Things (IoT) device such as a thermostat 508, a personal heath device 510, or a laptop 512.

The system 102 provides, to the UE 502, connectivity to a network. As an example, the system may be a wireless local area network (WLAN) access point that connects the UE 502 to the internet. As another example, the system 102 may be a "hotspot" that connects the UE 502 to a cellular network such as a Fifth Generation New Radio (5G NR) network.

FIG. 5 also illustrates the bottom housing 108 of the system 102 interfacing the system to a surface (e.g., the surface 210 of FIG. 2). The bottom housing 108 (e.g., the bottom housing 108 containing the printed circuit board 110 having the one or more light-emitting components 112 and the annular light-guide 114) provides an exterior glow 514 under the bottom housing 108 (e.g., the reflected light 212 of FIG. 2).

The exterior glow 514 under the bottom of the housing may be a result of one or more methods performed by the system 102. For example, a processor of the system 102 may execute instructions of a lighting manager application (illustrated in FIG. 6 and discussed with reference to that figure). The lighting manager application causes the system 102 to determine an operational status of the system 102. Based on the operational status of the system 102, the lighting manager application further causes the system 102 to select a color and activate one or more light-emitting components (e.g., the one or more light-emitting components 112), effectuating the radiating of light corresponding to the selected color and providing the exterior glow 514 under the bottom housing 108.

Figure 6:
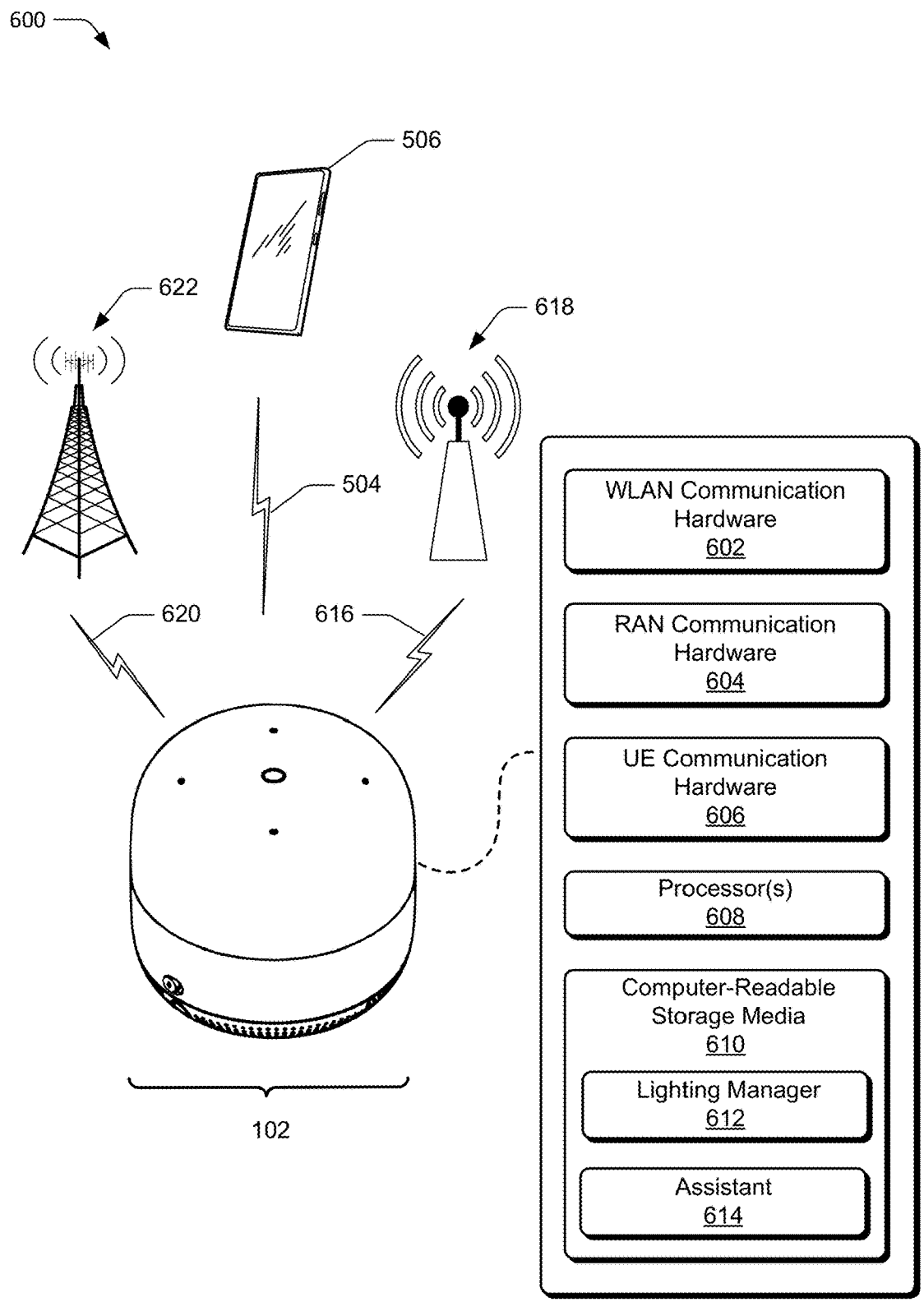
FIG. 6 illustrates functional elements of an example system having an annular light-guide in accordance with one or more aspects.

FIG. 6 illustrates functional elements of an example system having an annular light-guide in accordance with one or more aspects. The system may be the system 102 of FIG. 1 and include elements of FIGS. 1-5.

As illustrated, the system 102 includes different types of communication hardware (e.g., transceivers, antennas, circuitry, ports) for the system 102 to communicate with different types of networks and a user equipment. As illustrated, by FIG. 6, the system 102 includes wireless local area network (WLAN) communication hardware 602, radio access network (RAN) communication hardware 604, and UE communication hardware 606.

The system 102 also includes processor(s) 608 and computer-readable storage media 610 (CRM 610). The processor(s) 608 may be a single-core processor or a multiple-core processor composed of a variety of materials, such as silicon, polysilicon, high-K dielectric, copper, and so on. The computer-readable storage media 610 described herein excludes transmitting signals. CRM 610 may include any suitable memory or storage device such as random-access memory (RAM), static RAM (SRAM), dynamic RAM (DRAM), non-volatile RAM (NVRAM), read-only memory (ROM), or Flash memory.

CRM 610 also includes a lighting manager application 612. Alternately or additionally, the lighting manager application 612 may be implemented in whole or part as hardware logic or circuitry integrated with or separate from other components of the system 102. The lighting manager application 612 may include code that is executable by the processor(s) 608. The lighting manager application 612 may also include one or more cross-reference tables having content that is predetermined by a manufacturer of the system 102 or that is modifiable by a user of the system 102. The CRM 610 also includes an assistant application 614 (e.g., a virtual assistant). The assistant application 614 may include code that is executable by the processor(s) 608. Under different scenarios, the lighting manager application 612 and/or the assistant application may implement one or more of the techniques described herein.

The WLAN communication hardware 602 provides the system 102 access to an internet network through wireless link 616 connecting the system 102 to access point 618 (e.g., another mesh network device, a router). The RAN communication hardware 604 provides the system 102 access to a cellular network through wireless link 620 connecting the system 102 to a base station 622. The UE communication hardware 606 provides the smartphone 506 access to the system 102 through wireless link 504, providing the smartphone 506 indirect access to either the cellular network or the internet network.

The combination of communication hardware FIG. 6 illustrates is by way of example only, as other types or combinations of communication hardware that may provide access to different types of networks are possible (e.g., global navigation satellite system (GNSS) communication hardware, infrared communication hardware).

Example Method

Figure 7:
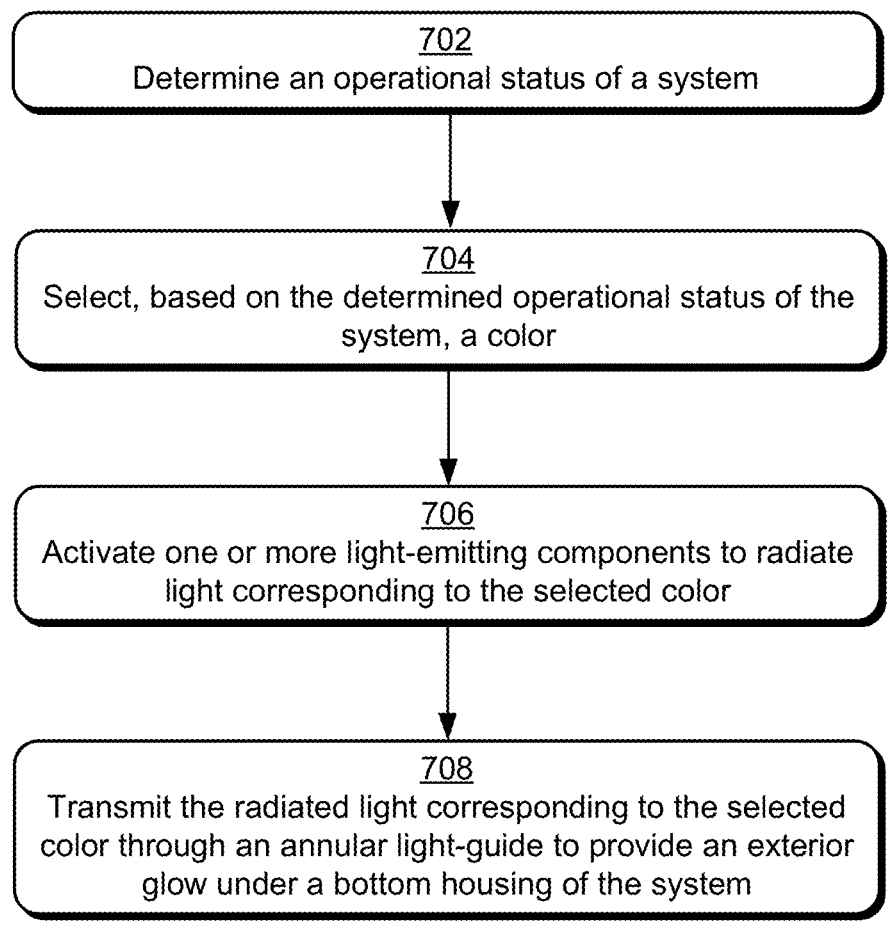
FIG. 7 illustrates an example method performed by a system having an annular light-guide in accordance with one or more aspects.

FIG. 7 illustrates an example method 700 performed by a system having an annular light-guide in accordance with one or more aspects. The system (e.g., the system 102 of FIG. 1) is caused to perform the method 700 by a processor (e.g., the processor 608) executing code of a lighting manager application (e.g., the lighting manager application 612). Operations of the method 700 are described in a series of blocks 702-708 and are not limited to the order or sequence as described below. Furthermore, the example method 700 may utilize elements of FIGS. 1-6.

At block 702, the system 102 determines an operational status of the system 102. In some instances, determining the operational status of the system 102 includes determining a degree of connectivity of the system 102 to an access point of a wireless local area network (e.g., the access point 616), determining a degree of connectivity of the system 102 to a base station of a radio access network (e.g., the base station 620), or determining a degree of connectivity of the system 102 to a user equipment (e.g., the user equipment 502). In such instances, a respective degree of connectivity may relate to a received signal strength indicator (RSSI).

In other instances, determining the operational status of the system 102 includes determining a rate of data being communicated through the system 102. This may correspond to a rate of data being communicated between the user equipment 502 and wireless local area network or a rate of data being communicated between the user equipment 502 and a radio access network.

Furthermore, determining the operational status of the system 102 at 702 may be triggered through a variety of mechanisms. Determining the operational status of the system 102 may be in response to the system 102 powering up, may be in response to a signal that the system 102 receives from the access point 616 of the wireless local area network, a signal that the system receives from the base station 620 of the radio access network, or a signal that the system 102 receives from the user equipment 502.

At block 704, the system 102 selects, based on the determined operational status of the system 102, a color. In some instances, the system 102 selects the color from a cross-reference table having content that is predetermined by a manufacturer of the system 102. In other instances, the system 102 selects the color from a cross-reference table having content that is modifiable by a user of the system.

For example, the content of the cross-reference table may associate the system 102 being fully operational to "green," the system 102 exchanging data at a throttled rate to "yellow," and the system 102 being non-operational to "red." As another example, the content of the cross-reference table may associate a network error or a factory reset to "yellow" and a volume change of the system 102 to "white."

Examples of other operational status include a boot status of the system 102, a volume level of a speaker of the system 102, an updating status of the system 102, a "listening" mode of the system 102, a response status of the system 102, and so on. Furthermore, and in addition to the cross-reference table including color information, the cross-reference table may also include information that indicates predetermined time durations, intermittencies, and intensities that the system may 102 may apply to activating one or more of the light-emitting components 112.

At block 706, the system 102 activates one or more of the light-emitting components 112 to radiate light corresponding to the selected color (e.g., the color selected at block 704). In some instances, activating the one or more of the light-emitting components 112 includes using pulse-width modulation to combine light from a red light-emitting diode, a green light-emitting diode, and a blue light-emitting diode contained in each of the one or more light-emitting components to radiate the selected color. In other instances, activating the one or more light-emitting components 112 includes activating a single light-emitting diode that radiates a single color of light corresponding to the selected color. Furthermore, and at block 706, activating the one or more light-emitting components 112 can include activating the one or more light-emitting components 112 in accordance with a predetermined time duration, intermittency, or intensity.

At block 708, the system 102 transmits the radiated light corresponding to the selected color through an annular light-guide (e.g., the annular light-guide 114) to provide an exterior glow under a bottom housing of the system 102 (e.g., the bottom housing 108). Transmitting the radiated light corresponding to the selected color through the annular light-guide 114 may include various aspects, including receiving and spreading the radiated light through a curved recess (e.g., the curved recess 306) of a light pipe (e.g., the light pipe 204) that is an inner-annular portion of the annular light-guide 114. Transmitting the radiated light corresponding to the selected color through the annular light-guide 114 may also include transmitting the radiated light through a diffuser (e.g., the diffuser 206) that is an outer-annular portion of the annular light-guide 114. The transmitted light causes an exterior glow that indicates the determined operational status of the system 102.

The method 700 may be modified to include additional or alternative steps. As an example, the method may include determining that the operational status of the system no longer exists and deactivating the one or more light-emitting components 112. The method may also include the system 102 detecting the color or intensity of reflected light (e.g., light reflected from the surface 210 of FIG. 5) and adjusting or modifying the activation of the one or more light-emitting components 112 based on the detected color or intensity.

As another example, the assistant application 614 can cause the system 102 to determine and indicate the operational status of the system through audible commands and/or messaging. For example, if a command is received through a microphone of the system 102, the assistant application 614 can cause the system 102 to indicate the operational status through a message emitted through a speaker of the system. In such an instance, the messaging may supplement or replace the operational status that is indicated by the exterior glow.

In the following paragraphs, several examples are described.

Example 1: A system comprising: a top housing that is radially centered along a first portion of a central axis; and a bottom housing that is radially centered along a second portion of the central axis, an interior space of the bottom housing containing: a printed circuit board having one or more light-emitting components; and an annular light-guide, the annular light-guide configured to transmit light radiated from the one or more light-emitting components to provide an exterior glow under the bottom housing.

Example 2: The system of example 1, wherein the one or more light-emitting components are disposed in a plane that is orthogonal to the central axis and the annular light-guide is disposed in another plane that is orthogonal to the central axis.

Example 3: The system of example 2, wherein the annular light-guide includes an inner-annular portion that is a light pipe and an outer-annular portion that is a diffuser.

Example 4: The system of example 3, wherein an inner circumference of the light pipe includes, for each of the one or more light-emitting components, a respective curved recess to spread light.

Example 5: The system of example 4, further comprising a footing that interfaces the bottom housing to a surface.

Example 6: The system of example 5, wherein the footing causes a gap between the bottom housing and the surface that effectuates a reflection of the exterior glow from the surface.

Example 7: The system of example 6, further comprising a sensor that can detect a color of the light.

Example 8: The system of example 5, wherein a reflector is disposed between the footing and the annular light-guide.

Example 9: The system of example 8, wherein a pressure-sensitive adhesive is disposed between the reflector and the annular light-guide.

Example 10: The system of example 2, wherein the one or more light-emitting components are electrically connected to a printed circuit board that includes one or more drivers through which power is provided to the one or more light-emitting components.

Example 11: The system of example 10, wherein each of the one or more light-emitting components includes a red light-emitting diode, a blue light-emitting diode, and a green light-emitting diode.

Example 12: The system of example 11, wherein each of the one or more light-emitting components is a surface-mount package.

Example 13: The system of example 12, wherein each of the one or more light-emitting components is a through-hole package.

Example 14: The system of example 1, wherein an interior radius of a wall of the bottom housing as measured from the second portion of the central axis varies along the second portion of the central axis.

Example 15: The system of example 1, wherein an interior radius of a wall of the bottom housing measured from the second portion of the central axis is constant along the second portion of the central axis.

Example 16: The system of example 1, wherein the bottom housing is perforated.

Example 17: The system of example 1, wherein the bottom housing is formed through injection molding.

Example 18: The system of example 1, further comprising a processor and a computer-readable media storing instructions that, when executed by the processor, cause the system to: determine an operational status of the system; select, based on the determined operational status of the system, a color; and activate the one or more light-emitting components to radiate light corresponding to the selected color.

Example 19: The system of example 18, wherein determining the operational status of the system includes determining a degree of connectivity of the system to a wireless local area network, a degree of connectivity of the system to a radio access network, a degree of connectivity of the system to a user equipment, or a rate of data being communicated through the system.

Example 20: The system of example 18, wherein the example system is a mesh network device.

Example 21: A method performed by a system, the method comprising: determining an operational status of the system; selecting, based on the determined operational status of the system, a color; and activating one or more light-emitting components to radiate light corresponding to the selected color, wherein the radiated light corresponding to the selected color transmits through an annular light-guide of the system to provide an exterior glow around a perimeter of the system.

Example 22: The method of example 21, wherein providing the exterior glow around a perimeter of the system provides the exterior glow around a perimeter that is under a bottom housing of the system.

Example 23: The method of example 21, wherein determining the operational status of the system is in response to the system powering up.

Example 24: The method of example 21, wherein determining the operational status of the system includes determining a degree of connectivity of the system to an access point of a wireless local area network.

Example 25: The method of example 24, wherein determining the operational status of the system is in response to a signal that the system receives from the access point of the wireless local area network.

Example 26: The method of example 21, wherein determining the operational status of the system includes determining a degree of connectivity of the system to a base station of a radio access network.

Example 27: The method of example 26, wherein determining the operational status of the system is in response to a signal that the system receives from a base station of the radio access network.

Example 28: The method of example 21, wherein determining the operational status of the system includes determining a degree of connectivity of the system to a user equipment.

Example 29: The method of example 28, wherein determining the operational status of the system is in response to a signal that the system receives from the user equipment.

Example 30: The method of example 21, wherein determining the operational status of the system includes determining a rate of data being communicated through the system.

Example 31: The method of example 30, wherein the rate of data being communicated through the system is a rate of data being communicated between a user equipment and a wireless local area network.

Example 32: The method of example 30, wherein the rate of data being communicated through the system is a rate of data being communicated between a user equipment and a radio access network.

Example 33: The method of example 21, wherein selecting the color based on the determined operational status of the system includes selecting the color from a cross-reference table having content that can be modified by a user.

Example 34: The method of example 21, wherein selecting the color based on the determined operational status of the system includes selecting the color from a cross-reference table having content that is predetermined by a manufacturer of the system.

Example 35: The method of example 21, wherein activating the one or more light-emitting components to radiate light corresponding to the selected color includes using pulse-width modulation to combine light from a red light-emitting diode, a green light-emitting diode, and a blue light-emitting diode contained in each of the one or more light-emitting components.

Example 36: The method of example 21, wherein activating the one or more light-emitting components to radiate the selected color includes activating a single light-emitting diode that radiates a single color of light that corresponds to the selected color.

Example 37: The method of example 21, wherein activating the one or more light-emitting components to radiate the light corresponding to the selected color includes activating the one or more light-emitting components intermittently.

Example 38: The method of example 21, wherein activating the one or more light-emitting components to radiate the light corresponding to the selected color includes activating the one or more light-emitting components for a predetermined time duration.

Example 39: The method of example 21, wherein transmitting the radiated light corresponding to the selected color through the annular light-guide includes transmitting the radiated light through a curved recess of a light pipe that is an inner-annular portion of the annular light-guide.

Example 40: The method of example 21, wherein transmitting the radiated light corresponding to the selected color through the annular light-guide includes transmitting the radiated light through a diffuser that is an outer-annular portion of the annular light-guide.

What is claimed is:

1. A system comprising:
    a top housing that is radially centered along a first portion of a central axis;
    a bottom housing that is radially centered along a second portion of the central axis, the bottom housing including:
        a printed circuit board having one or more light-emitting components; and
        an annular light-guide, the annular light-guide configured to transmit light radiated from the one or more light-emitting components to provide an exterior glow under the bottom housing; and
    a footing that interfaces the bottom housing to a surface, the footing causing a gap between the bottom housing and the surface that effectuates a reflection of the exterior glow from the surface, a dimension of the gap configured based on one or more attributes of light radiated from the one or more light-emitting components, the attributes of light comprising at least one of an intensity or a color.

2. The system of claim 1, wherein the printed circuit board is disposed in a plane that is orthogonal to the central axis and the annular light-guide is disposed in another plane that is orthogonal to the central axis.

3. The system of claim 2, wherein the annular light-guide includes an inner-annular portion that is a light pipe and an outer-annular portion that is a diffuser, the inner-annular portion that is a light pipe including, for each of the one or more light-emitting components, a respective curved recess to receive and spread light.

4. The system of claim 1, wherein each of the one or more light-emitting components includes a red light-emitting diode, a green light-emitting diode, and a blue light-emitting diode.

5. The system of claim 4, wherein each of the one or more light-emitting components is a type of package that is a surface-mount package or a through-hole package.

6. The system of claim 1, wherein an interior radius of a wall of the bottom housing as measured from the second portion of the central axis varies when measured along the second portion of the central axis.

7. The system of claim 1, wherein the system is a mesh network device.

8. The system of claim 1, further comprising a processor and a computer-readable media storing instructions that, when executed by the processor, cause the system to:
    determine an operational status of the system;
    select, based on the determined operational status of the system, a color; and
    activate the one or more light-emitting components to radiate light corresponding to the selected color.

9. The system of claim 1, wherein an interior radius of a wall of the bottom housing measured from the second portion of the central axis is constant along the second portion of the central axis.

10. The system of claim 1, wherein the attributes of light radiated from the one or more light-emitting components upon which the dimension of the gap is configured comprise the intensity and color of light radiated from the one or more light-emitting components.

11. The system of claim 1, wherein a reflector is disposed between the footing and the annular light-guide.

12. The system of claim 1, wherein a pressure-sensitive adhesive is disposed between a reflector and the annular light-guide.

13. The system of claim 1, wherein the provision of the exterior glow under the bottom housing provides the exterior glow around at least portions of a perimeter that is under the bottom housing of the system.

14. A method comprising:
    determining, by means of a processor of a system, an operational status of the system;
    selecting, by means of the processor and based on the determined operational status of the system, a color; and
    activating, by means of the processor, one or more light-emitting components to radiate light corresponding to the selected color, the radiated light transmitting through (i) an annular light-guide to provide an exterior glow and (ii) under a bottom housing of the system that interfaces to a surface through a footing effective to cause a reflection of the exterior glow from the surface, the footing causing a gap between the bottom housing and the surface, a dimension of the gap configured based on one or more attributes of light radiated from the one or more light-emitting components, the attributes of light comprising at least one of an intensity or a color.

15. The method of claim 14, further comprising:
    determining that the operational status of the system no longer exists; and
    deactivating the one or more light-emitting components.

16. The method of claim 14, wherein determining the operational status of the system includes determining a degree of connectivity of the system to a wireless local area network, determining a degree of connectivity of the system to a radio access network, determining a degree of connectivity of the system to a user equipment, or determining a rate of data being communicated through the system.

17. The method of claim 14, wherein selecting the color based on the determined operational status of the system includes selecting the color from a cross-reference table having content that can be modified by a user or selecting the color from a cross-reference table having content that is predetermined by a manufacturer of the system.

18. The method of claim 14, wherein activating the one or more light-emitting components includes activating the one or more light-emitting components for a predetermined time duration.

19. The method of claim 14, wherein determining the operational status of the system is in response to the system powering up.

20. The method of claim 14, wherein the provision of the exterior glow provides the exterior glow around a perimeter that is under the bottom housing of the system.

* * * * *